United States Patent [19]

Oyama

[11] Patent Number: 4,480,847
[45] Date of Patent: Nov. 6, 1984

[54] STEERING DEVICE FOR VEHICLE
[75] Inventor: Kazuo Oyama, Niiza, Japan
[73] Assignee: Honda Giken Kogyo Kabushiki Kaisha, Tokyo, Japan
[21] Appl. No.: 417,348
[22] Filed: Sep. 13, 1982
[30] Foreign Application Priority Data
  Sep. 14, 1981 [JP] Japan ................... 56-145019
[51] Int. Cl.³ .............................. B62K 21/00
[52] U.S. Cl. ........................ 280/270; 280/92
[58] Field of Search ........ 280/270, 274, 279, 281 LP, 280/263, 92; 180/210, 211, 219, 223
[56] References Cited
  U.S. PATENT DOCUMENTS
  1,668,368  5/1928  Herds .................. 280/92
  4,353,567 10/1982 Weldy ................. 280/270

Primary Examiner—Joseph F. Peters, Jr.
Assistant Examiner—D. Lynn Fugate
Attorney, Agent, or Firm—Armstrong, Nikaido, Marmelstein & Kubovcik

[57] ABSTRACT

A steering device for a vehicle including a steerable wheel, a front fork rotatably supporting the same, a steering member connected to the front fork, and a link mechanism. The link mechanism supports the front fork on the frame of the vehicle to allow it to rotate with respect to a given steering axis while restricting any other motions. The link mechanism includes a pair of first links having axes intersecting the steering axis and three second links arranged on planes including the steering axis but not the axes of the first links.

3 Claims, 6 Drawing Figures

STEERING DEVICE FOR VEHICLE

BACKGROUND OF THE INVENTION

The present invention relates to a steering device applied to a vehicle, mainly, a two or three-wheeled vehicle having a single steerable wheel.

DESCRIPTION OF THE PRIOR ART

A typical steering device as has been hitherto widely used for two or three-wheeled vehicles has a steering shaft secured to the upper end of an upright front fork rotatably supporting a steerable wheel. The steering shaft is rotatably carried in a head pipe at the front end of the frame, and a steering member is connected to the upper end of the steering shaft. According to this type of steering device, however, the steering member is located at the position above the steerable wheel, forcing the road clearance of the driver's seat to be relatively large. Therefore, the abovementioned steering device is unsuitable for a vehicle wherein the driver's seat is positioned closer to the ground in order for the driver to ride in a posture with a low center of gravity.

SUMMARY OF THE INVENTION

An object of the present invention is to provide a steering device wherein the steering shaft is eliminated and a front fork is steerably supported even in a tilted position, whereby the driver can steer the vehicle without any hindrance to the forward sight even when riding in a posture with a low center of gravity.

In order to attain the object, the present invention is characterized in that a front fork rotatably supporting a steerable wheel is carried on a frame through a pair of links arranged so that the extensions of their respective axes intersect a given steering axis of the steerable wheel, together with three further links arranged so as to allow the front fork to rotate with respect to the steering axis in cooperation with both of the first-mentioned links while restricting any other motions, and a steering member is connected to the front fork.

DESCRIPTION OF THE PREFERRED EMBODIMENT

Figure 1:
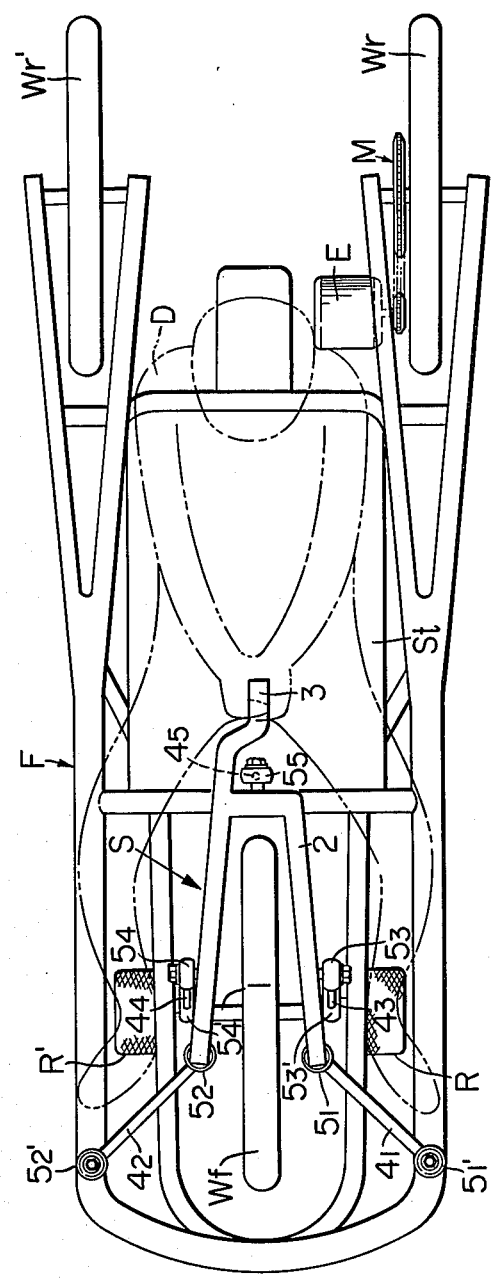
FIG. 1 is a plan view of a three-wheeled vehicle equipped with the steering device according to the present invention.
Figure 2:
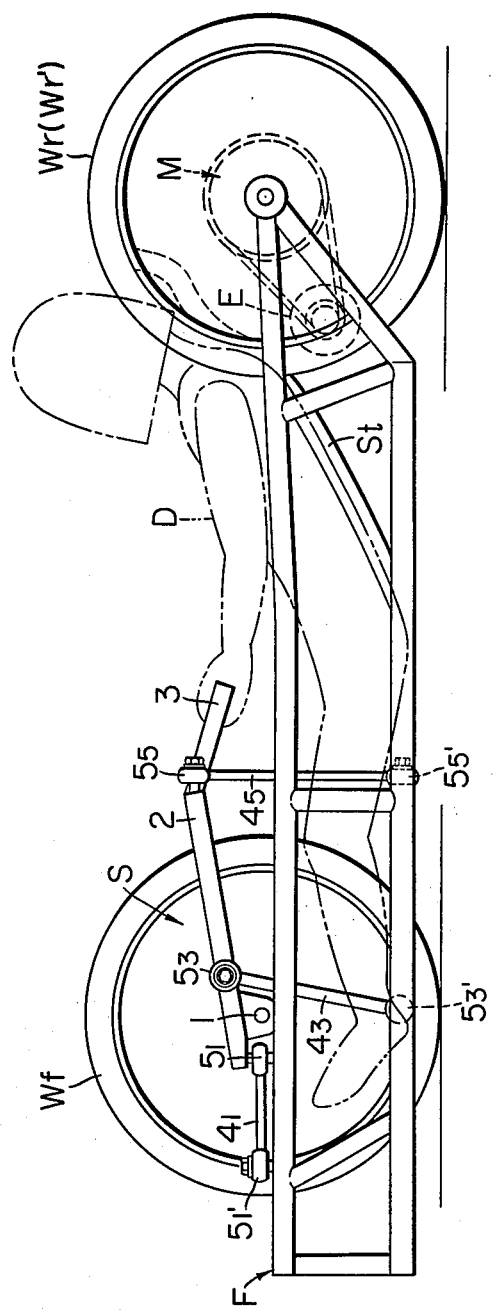
FIG. 2 is a side view of the three-wheeled vehicle.

One embodiment according to the present invention will be described in the following, with reference to the accompanying drawings. In FIGS. 1 and 2, a frame F is provided having a very low road clearance. A single front wheel or a steerable wheel Wf is supported at the front part of the frame through a steering device S according to the present invention, while a pair of right and left rear wheels Wr, Wr' are rotatably supported at the rear end part of the frame F individually. The right rear wheel Wr' is driven by an engine E mounted at a proper position on the frame F through a transmission gear M. In addition, the frame F is provided with a seat St placed in its center and a pair of foot rests, R, R' arranged on both the right and left sides of the steerable wheel Wf so that a driver D rides in a posture with his or her feet placed on both sides of the steerable wheel Wf from the rear.

Figure 3:
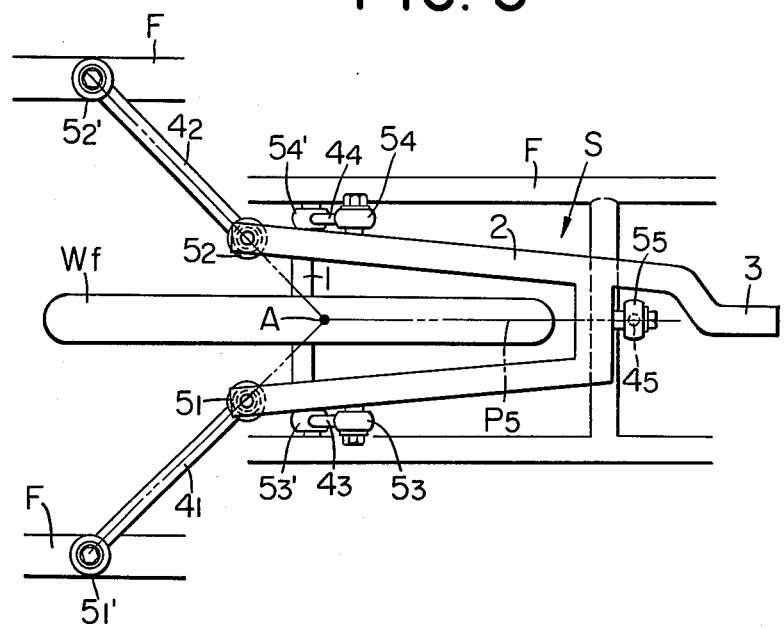
FIG. 3 is an enlarged plan view of the steering device.

The steering device S is described in greater detail in the following, with reference to FIGS. 3 and 4.

A front axle 1 rotatably supporting the steerable wheel Wf is carried on a front fork 2 at both its ends, which front fork 2 is arranged tiltingly rearward, and a steering member 3 is attached to its rear end.

To both the right and left side portions at the front end of the front fork 2, one end of each of a pair of horizontal links $4_1$, $4_2$ are connected to the frame F through ball joints $5_1$, $5_2$, respectively. In this case, both the links $4_1$, $4_2$ are arranged so that the extensions of their axes intersect a given steering axis A, arbitrarily set, of the steerable wheel Wf. The caster angle of the steering axis A is represented by $\theta$.

Moreover, one end of each of a pair of links $4_3$, $4_4$ are connected to both the right and left side portions of the intermediate part of the front fork 2 through ball joints $5_3$, $5_4$ respectively, while the other ends of the links $4_3$, $4_4$ are connected to the frame F through ball joints $5_3'$, $5_4'$ respectively. Further, one end of a single link $4_5$ is connected to the rear end central part of the front fork 2 through a ball joint $5_5$, while the other end of the link $4_5$ is connected to the frame F through a ball joint $5_5'$. In this case, the abovementioned three links $4_3$, $4_4$ and $4_5$ are arranged so that their axes are located on planes $P_3$, $P_4$ and $P_5$ including the steering axis A but not present on a plane $P_1$ including the axes of the pair of links $4_1$, $4_2$ in the front part.

In the illustrated embodiment, the pair of links $4_3$, $4_4$ in the intermediate part are arranged in parallel with the steering axis A, while the link $4_5$ in the rear part is arranged so that the extension of its axis intersects the steering axis A at an upper position far apart from the steerable wheel Wf.

Thus, cooperating with each other, the five links $4_1$–$4_5$ restrict the motion of the front fork 2 with respect to the frame F in the following five directions as follows:

(1) links restricting the vertical translational motion . . . $4_3$, $4_4$ and $4_5$;

(2) links restricting the lateral translational motion . . . $4_1$ and $4_2$;

(3) links restricting the longitudinal translational motion . . . $4_1$ and $4_2$;

(4) links restricting the lateral tilting . . . $4_3$ and $4_4$; and (5) links restricting the longitudinal tilting . . . $4_3$, $4_4$ and $4_5$.

Because, as mentioned above, the extensions of the pair of links $4_1$, $4_2$ in the front part intersect the steering axis A and because the axes of the other three links $4_3$, $4_4$ and $4_5$ are located on the planes $P_3$, $P_4$ and $P_5$ including the steering axis A, each of the links $4_1$–$4_5$ allows the front fork 2 to rotate with respect to the steering axis A. Accordingly, when the driver D swings the steering member 3 rightward or leftward, the steerable wheel Wf can be turned rightward of leftward with respect to the steering axis A.

Figure 4:
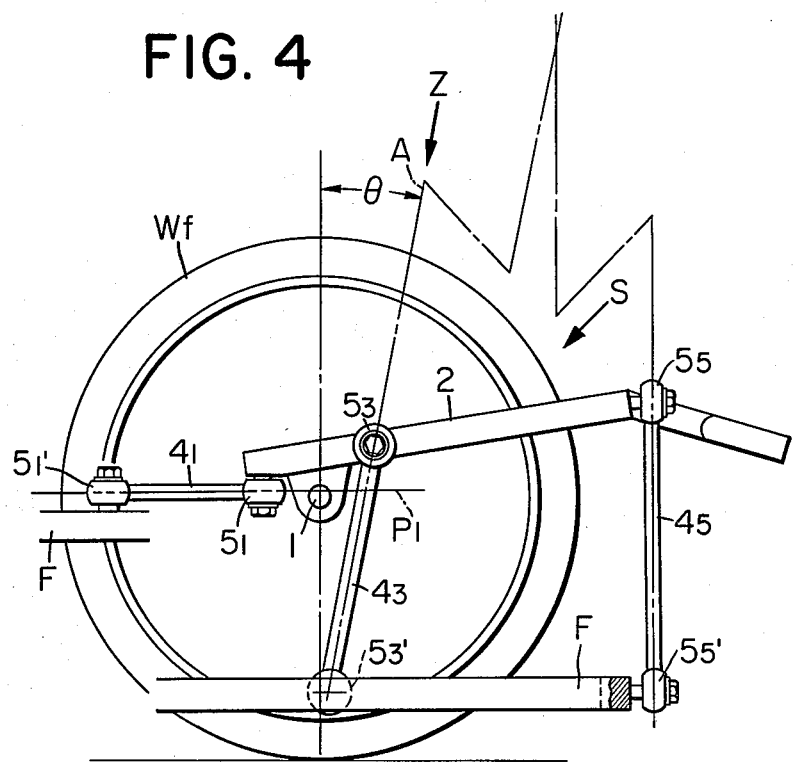
FIG. 4 is a side view of the steering device.
Figure 5:
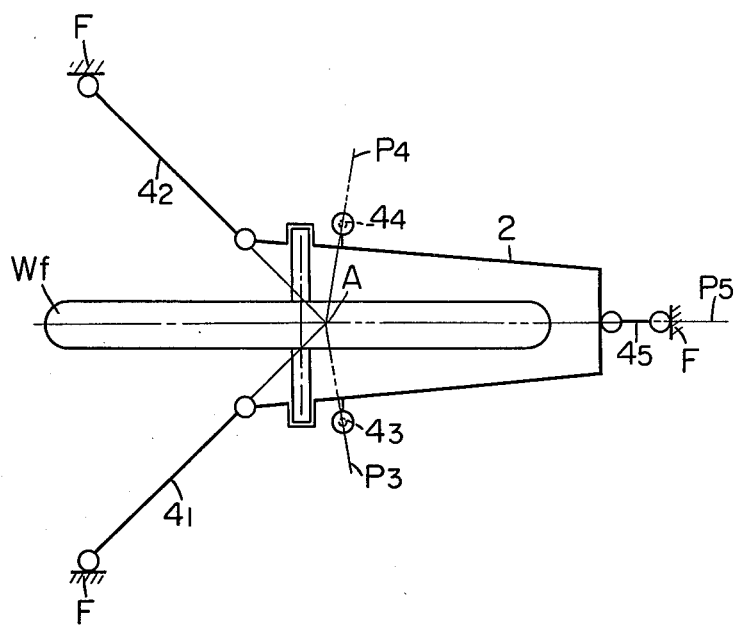
FIGS. 5 and 6 are diagrammatic views of the steering device in the straight running state and turning state of the vehicle, respectively, as viewed in the direction of an arrow Z in FIG. 4.
Figure 6:
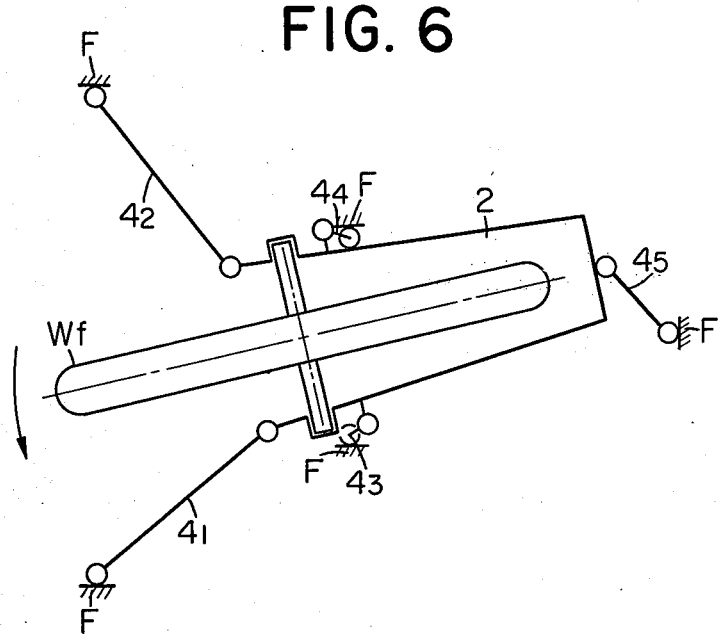

FIGS. 5 and 6, which are diagrammatic views showing the steering device in the straight running state and the turning state of the vehicle, respectively, are drawn as plan views seen in the direction of an arrow Z in FIG. 4 or along the steering axis A.

As mentioned above, according to the present invention, no steering shaft is employed unlike conventional devices, but the front fork 2 is supported by means of the frame F through the five links $4_1$–$4_5$ so that the front fork 2 is allowed to rotate with respect to the given steering axis A while the other motions are restricted.

Therefore, the supporting angle of the front fork 2 can be selected at will by means of the arrangement of each of the links $4_1$–$4_5$, so that supporting the front fork 2 in the tilting state permits the driver to steer easily without any hindrance to the forward sight in a vehicle wherein the driver D rides in a posture with a low center of gravity.

I claim:

1. A steering device for a vehicle, comprising a steerable wheel, a front fork rotatably supporting the steerable wheel, a link mechanism supporting the front fork on a frame of the vehicle so as to allow said front fork to rotate with respect to a given steering axis of said steering wheel while restricting other motions, and a steering member connected to said front fork, said link mechanism including a pair of first links arranged so that the extensions of their respective axes intersect said given steering axis, and three second links arranged so as to allow said front fork to rotate with respect to said steering axis in cooperation with these first links while restricting the other motions.

2. A device as defined in claim 1 wherein said second links are arranged so as to be located on planes including said steering axis but not present on a plane including the axes of said first links.

3. A device as defined in claim 2 wherein two of said second links are arranged in parallel with said steering axis while the other link is arranged so that the extension of its axis intersects said steering axis at an upper position far apart from said steerable wheel.

* * * * *